No. 741,251. PATENTED OCT. 13, 1903.
F. LAMBERT.
WATER METER.
APPLICATION FILED APR. 28, 1902.
NO MODEL.

Attest:
Geo. H. Botts
Mabelle F. Lake

Inventor
Frank Lambert
By Edith J. Griswold
Atty

No. 741,251. Patented October 13, 1903.

UNITED STATES PATENT OFFICE.

FRANK LAMBERT, OF BROOKLYN, NEW YORK.

WATER-METER.

SPECIFICATION forming part of Letters Patent No. 741,251, dated October 13, 1903.

Application filed April 28, 1902. Serial No. 105,059. (No model.)

*To all whom it may concern:*

Be it known that I, FRANK LAMBERT, a citizen of the United States, and a resident of New York city, borough of Brooklyn, Kings county, State of New York, have invented Improvements in Water-Meters, of which the following is a specification.

This invention relates to water-meters, and more particularly to meters having a measuring-chamber in an external pressure-casing.

The object of this invention is to simplify the construction of the meter and to provide means to make direct water-pressure joints between the pressure-casing and chamber.

Figure 1:
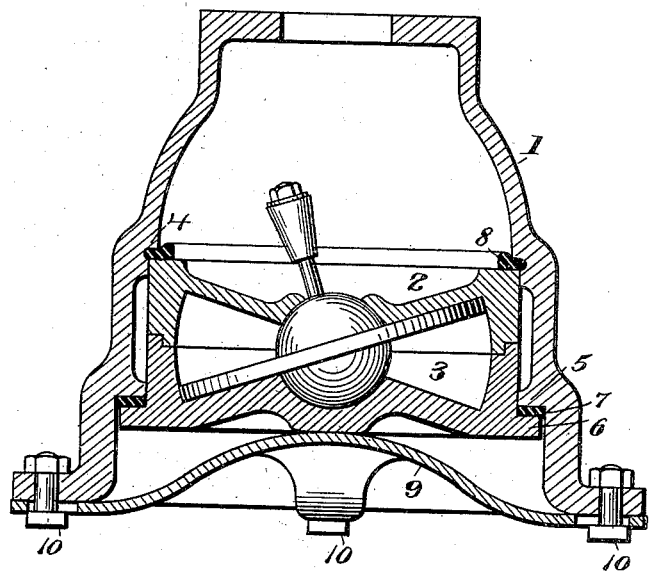
Figure 2:
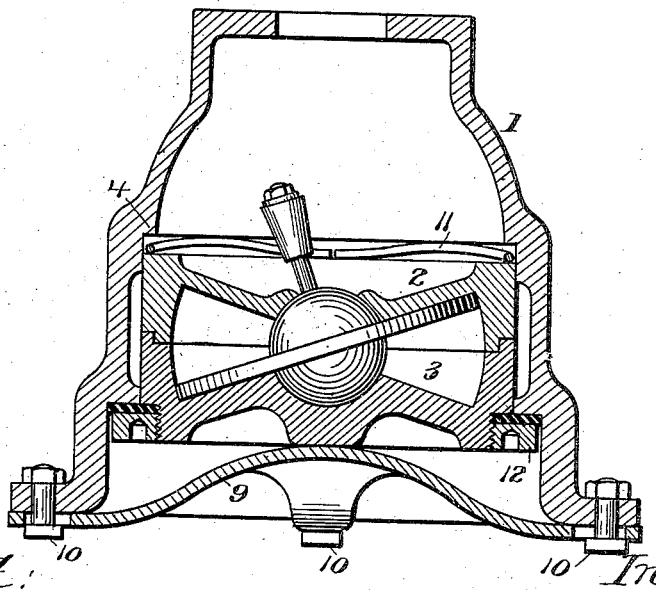

In the accompanying drawings, Figure 1 is a central sectional elevation of so much of a meter as is necessary to illustrate my invention, showing my improved construction. Fig. 2 is a similar view showing some slight modifications.

The generic construction and operation of meters of the kind here shown are so well known that a description thereof is omitted.

Referring to Fig. 1, the external casing 1 is formed with an opening for the admission of the measuring-chamber 2 3, which is closely but freely fitted in the bored portion of the casing and the chamber closes the said opening. The measuring-chamber may be formed of any number of sections, the construction here shown having two loose sections capable of being moved apart. The water-tight joint between the casing and the measuring-chamber is made by interposing a gasket or packing 7 between a shoulder 5 on the casing and a flange 6 on the lower part of the measuring-chamber—that is, as shown, on section 3. Between a shoulder 4 on the casing 1 and the upper part of the measuring-chamber I place an elastic packing 8, for a purpose hereinafter explained.

Any suitable means for holding the loose section 2 3 of the measuring-chamber firmly in position may be used. As shown, such means may consist of a leaf-spring 9, secured to the casing 1 by bolts 10 and pressing against the lower section 3 of the measuring-chamber. This spring 9 normally tends to push the measuring-chamber into its seat in the casing 1 with sufficient force to resist the normal internal pressure of the meter.

With a construction such as shown it is necessary that the gasket or packing 7 always be compressed in order to make a water-tight joint between the shoulder 5 and flange 6. It is also necessary in these meters that the meeting faces of the two sections 2 and 3 of the measuring-chamber be held in intimate contact with each other. Should the upper loose section 2 of the measuring-chamber come directly against the shoulder 4 in the casing 1, a constant and exact thickness of the compressed gasket 7 would be necessary to keep the joint 5 6 7 water-tight and at the same time to hold section 2 in intimate face contact with the flanged section 3. Such exactness will be difficult to maintain with a compressible gasket or packing after any such gasket has been in use. It will be evident that the gasket 7 could not be tightened up if the measuring-chamber were bearing hard against the shoulder 4 before the joint is formed by the gasket without bruising or deforming the measuring-chamber. Should the gasket 7 be too thick, then the two sections would not be held firmly together, as the upper face of section 2 would not be forced against the shoulder 4.

While not absolutely essential, I prefer to provide self-adjustable means to compensate for the variation in the thickness of the gasket 7 due to the pressing of the flanged section 3 of the measuring-chamber against the face or shoulder 5 of the pressure-casing. Such self-adjusting or yielding means may consist of a plastic or elastic packing 8, already described in reference to Fig. 1, or in place of the packing 8 a wire spring 11, Fig. 2, may bear against the section 2 and the shoulder 4 of the casing 1.

The flange 6 may be cast in one piece with the section 3 of the measuring-chamber, as shown in Fig. 1, or a separate flange 12 may be fastened to section 3, as shown in Fig. 2.

From the foregoing it will be seen that when there is sufficient pressure against the lower section 3 of the measuring-chamber, exerted by the spring 9 or any other suitable means, the gasket or packing 7 may be maintained compressed between the shoulder 5 and flange 6 and the upper loose section 2 held down against section 3 up to a predetermined point of internal pressure, this point being always made safely beyond the water-service pressure. It will also be evident that should the internal pressure become great enough to overcome the spring 9 or other means for holding the parts together the measuring-chamber would be free to be forced out of normal position; also the loose sections 2 and 3 would be free to be moved apart from expansion due to freezing or from any other cause, and thus prevent distortion or bursting of the meter under a supernormal internal pressure.

I do not limit myself to the special constructions herein shown; but

What I claim as my invention is—

1. In a water-meter, a pressure-casing provided with a shoulder, mounted therein a measuring-chamber formed of loose sections, one of said sections being flanged, and a gasket between said flange and said shoulder, adapted to close with a tight joint against water-service pressure one end of said pressure-casing, while the other section is held in an intimate face contact with the flanged one.

2. In a water-meter, a pressure-casing provided with a shoulder, mounted therein a measuring-chamber formed of loose sections, one of said sections being flanged, and a gasket between said flange and said shoulder, adapted to close with a tight joint against water-service pressure one end of said pressure-casing, while the other section is held in intimate face contact with the flanged one, the said sections being free to be moved apart when there is an undue internal pressure.

3. In a water-meter, a pressure-casing provided with a shoulder, mounted therein a measuring-chamber formed of loose sections, one of said sections being flanged, and a gasket between said flange and said shoulder adapted to close with a tight joint against water-service pressure one end of said pressure-casing, while the other section is held in an intimate face contact with the flanged one, said measuring-chamber being free to be forced out of normal position when there is undue internal pressure.

4. In a water-meter, a pressure-casing provided with a shoulder, mounted therein a measuring-chamber formed of loose sections, one of said sections being flanged, and a gasket between said flange and said shoulder, adapted to close with a tight joint against water-service pressure one end of said pressure-casing, while the other section is held in intimate face contact with the flanged one, said chamber being free to be forced out of normal position, and the chamber-sections to move apart when there is undue internal pressure.

In testimony whereof I have signed my name to this specification in the presence of two subscribing witnesses.

FRANK LAMBERT.

Witnesses:
EDITH J. GRISWOLD,
MABELLE F. LAKE.